United States Patent
Barrow et al.

(10) Patent No.: US 9,919,660 B2
(45) Date of Patent: Mar. 20, 2018

(54) MODULAR REAR SIDE LINING

(71) Applicant: Honda Motor Co., Ltd., Tokyo (JP)

(72) Inventors: Andrew Edward Barrow, Hilliard, OH (US); Jason Dilley, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/059,488

(22) Filed: Mar. 3, 2016

(65) Prior Publication Data

US 2017/0253196 A1    Sep. 7, 2017

(51) Int. Cl.
*B60R 13/02* (2006.01)
*B60R 21/21* (2011.01)
*B60R 22/00* (2006.01)

(52) U.S. Cl.
CPC ...... *B60R 13/0243* (2013.01); *B60R 13/0206* (2013.01); *B60R 21/21* (2013.01); *B60R 22/00* (2013.01); *B60R 2013/0287* (2013.01)

(58) Field of Classification Search
CPC . B60R 13/0243; B60R 13/0206; B60R 22/00; B60R 21/21; B60R 2013/0287
USPC ........................................... 296/39.1
See application file for complete search history.

(56) References Cited

U.S. PATENT DOCUMENTS

| | | | |
|---|---|---|---|
| 4,705,317 A * | 11/1987 | Henri | B62D 33/02 224/404 |
| 5,040,990 A | 8/1991 | Suman et al. | |
| 5,154,617 A | 10/1992 | Suman et al. | |
| 5,823,599 A | 10/1998 | Gray | |
| 6,086,129 A | 7/2000 | Gray | |
| 6,158,795 A | 12/2000 | Gray et al. | |
| 6,595,568 B1 * | 7/2003 | Schroeder | B60R 13/011 296/39.1 |
| 6,669,260 B2 | 12/2003 | Clark et al. | |
| 6,827,384 B2 | 12/2004 | Anderson et al. | |
| 6,832,799 B2 * | 12/2004 | Haspel | B60R 5/04 224/539 |
| 6,979,047 B2 | 12/2005 | Lin et al. | |
| 7,182,383 B2 | 2/2007 | Anderson et al. | |
| 2004/0084920 A1 | 5/2004 | Trimble et al. | |
| 2004/0084930 A1 | 5/2004 | Lin et al. | |
| 2004/0128917 A1 | 7/2004 | Lin et al. | |
| 2004/0155483 A1 | 8/2004 | Lin et al. | |
| 2012/0153672 A1 | 6/2012 | Ackermann et al. | |

FOREIGN PATENT DOCUMENTS

DE    19936597 A1    2/2001
DE    102005052528 A1    5/2007

* cited by examiner

Primary Examiner — Joseph D. Pape
Assistant Examiner — Dana D Ivey
(74) *Attorney, Agent, or Firm* — Honda Patents & Technologies North America, LLC; Mark E. Duell

(57) ABSTRACT

A modular side lining for a motor vehicle includes a fastener, a first lining member including a first surface along an edge of the first lining member and at least one receiver for receiving the fastener, and a second lining member including a second surface along an edge of the second lining member. The second surface abuts the first surface to form a split line, and an extension extending from the second surface has at least one hole for receiving the fastener.

11 Claims, 11 Drawing Sheets

SECTION A-A

SECTION B-B

MODULAR REAR SIDE LINING

TECHNICAL FIELD

The embodiments described herein are related to the field of side linings of the interior of a motor vehicle.

BACKGROUND

In the past, vehicle with different trim packages often included different parts in the same motor vehicle, such as two versions of a rear side lining, one with a storage pocket in the cargo area and a second with a vacuum in the cargo area. The two versions had separate base linings because of the different cargo area features, even though the armrest, cup holder, speaker grille, and electrical panel parts are the same between the two. A need exists to make as much of the vehicle parts standard as possible, thus limiting the need and size of exclusive parts for different trim variations of the same motor vehicle.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a modular side lining for a motor vehicle includes a fastener, a first lining member including a first surface along an edge of the first lining member and at least one receiver for receiving the fastener, a second lining member including a second surface along an edge of the second lining member, the second surface abutting the first surface to form a split line, and an extension extending from the second surface having at least one hole for receiving the fastener.

According to another aspect, a motor vehicle includes a frame, wheels operatively attached to the frame, a body fixed to the frame, a rear compartment area having a floor and two walls, a rear seat fixed to the floor of the rear compartment area; a tailgate for providing access to the compartment area, and a modular side lining for covering the at least one of the two walls of the compartment area. The modular side lining includes a fastener, a first lining member including a first surface along an edge of the first lining member and at least one receiver for receiving the fastener, and a second lining member including a second surface along an edge of the second lining member, the second surface abutting the first surface to form a split line, and an extension extending from the second surface having at least one hole for receiving the fastener.

The figures depict various embodiments of the embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Embodiments are now described with reference to the figures, in which like reference numbers indicate identical or functionally similar elements. Also in the figures, the left most digits of each reference number corresponds to the figure in which the reference number is first used.

Figure 1:
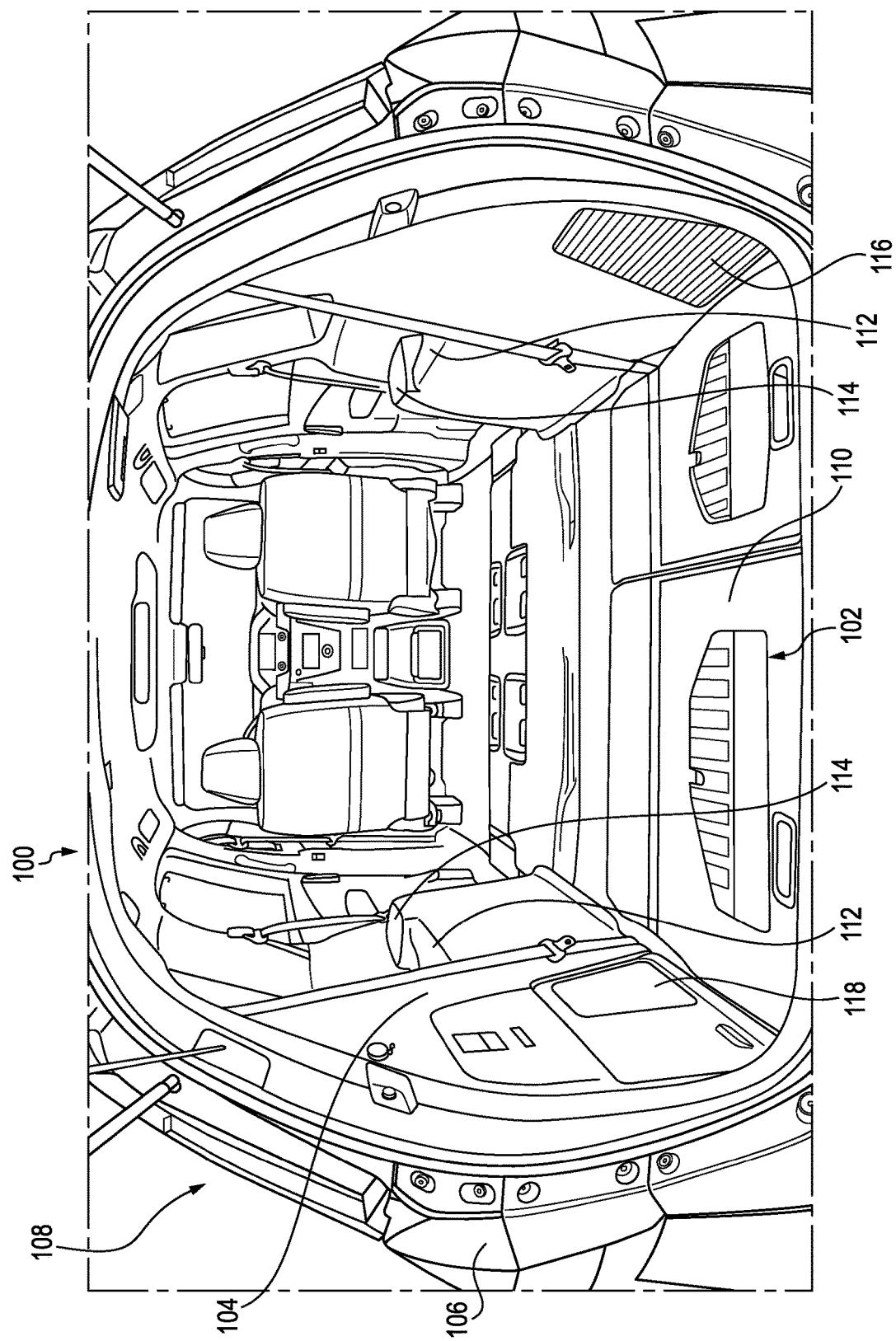
FIG. 1 is a view of a rear compartment of a motor vehicle.
Figure 2:
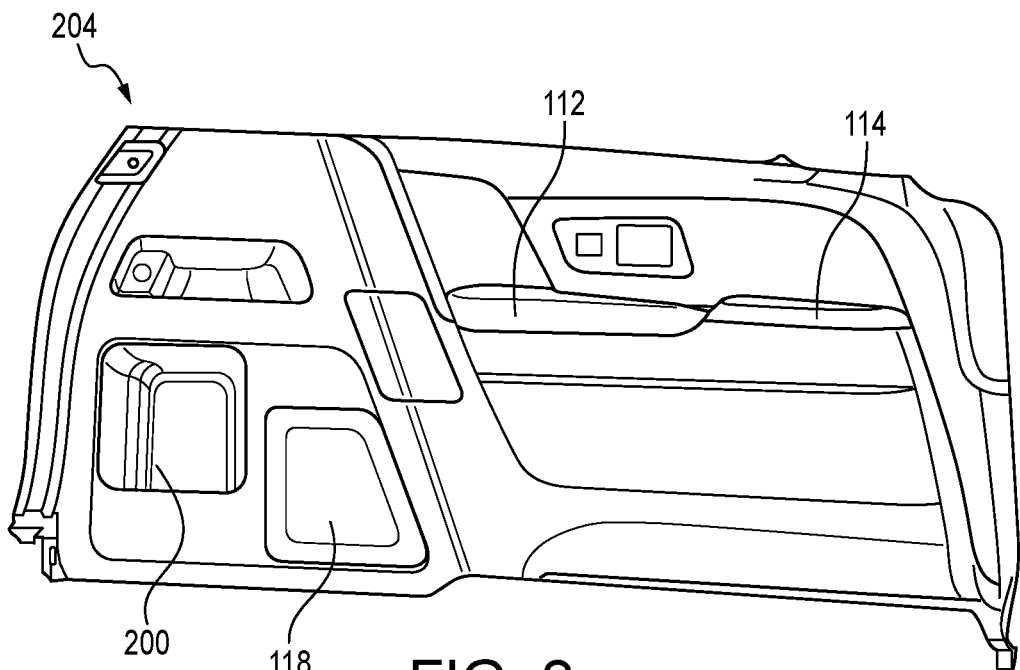
FIG. 2 is a side view of a prior art rear side lining.
Figure 3:
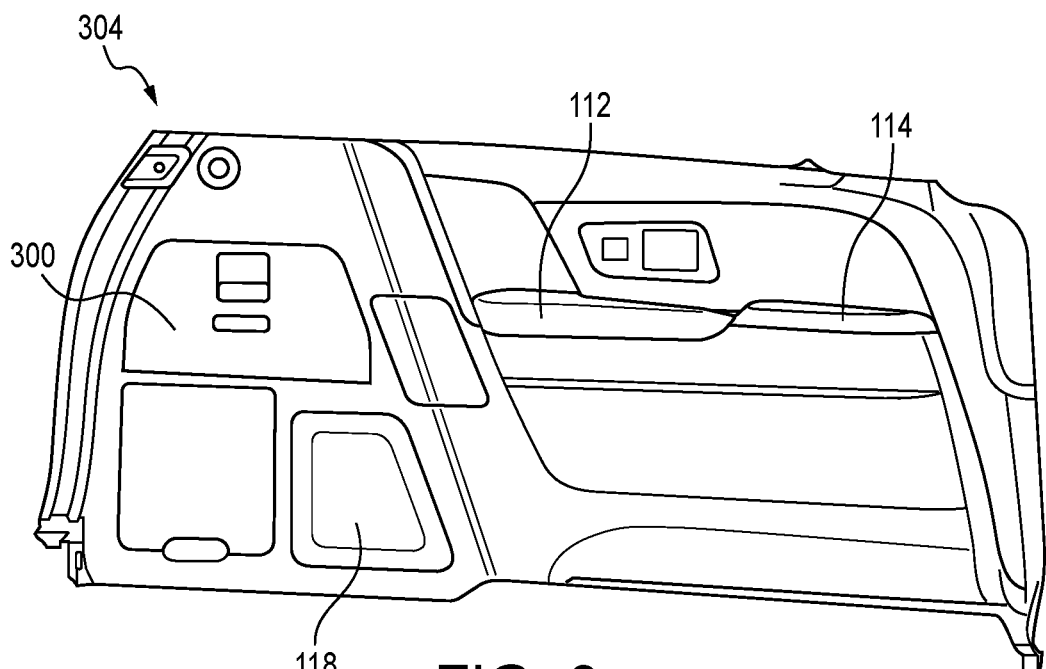
FIG. 3 is a side view of an alternate prior art rear side lining.

With respect to FIG. 1, the rear interior 102 of a motor vehicle 100, in this particular embodiment a minivan, is shown through the tailgate. The motor vehicle is of the typical type with a frame, wheels, and a body 108 on the frame. In the past, the rear side lining 104 of the rear interior 102 that covered a large portion of the side 106 of the body 108 of the motor vehicle 100. Due to differences in interior packaging, two versions of a rear side lining 104, illustrated in FIGS. 2 and 3, were produced. The first side lining 204, illustrated in FIG. 2, included a storage pocket 200 in the rear compartment or cargo area 110. The second side lining 304, illustrated in FIG. 3, included a compartment 300 to hold an in-vehicle vacuum (not shown) in the cargo area 110. The first side lining 204 and second side lining 304 have separate base linings because of the different cargo area features, even though the armrest 112, cup holder 114, speaker grille 116, and electrical panel parts 118 are the same between the two.

Figure 4:
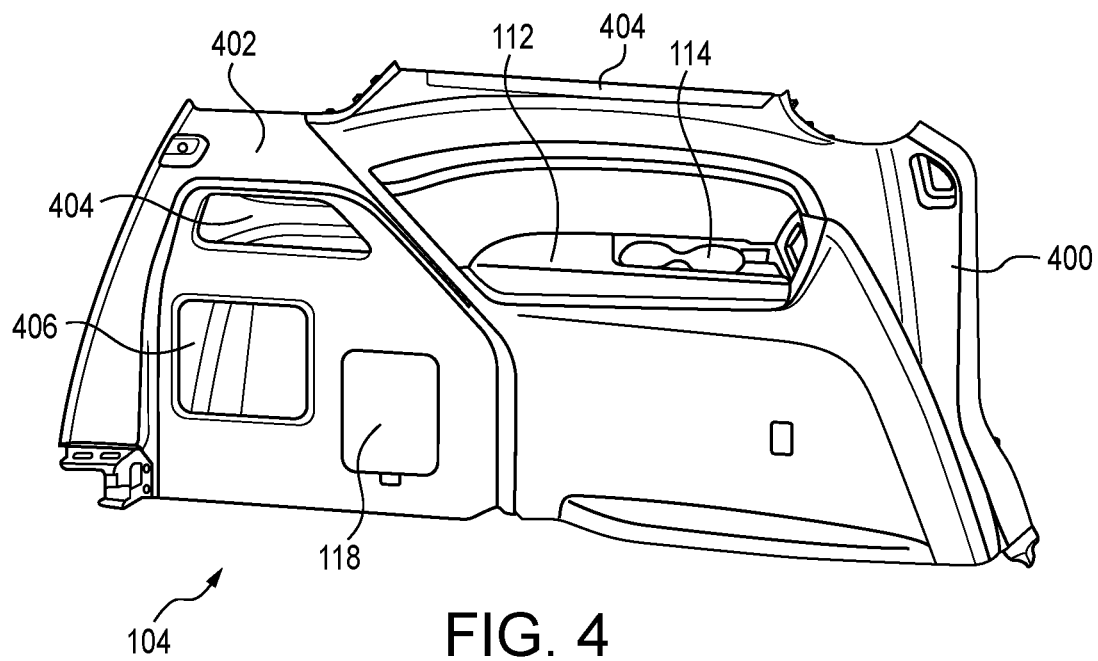
FIG. 4 is a side view of a first embodiment of a rear side lining.
Figure 5:
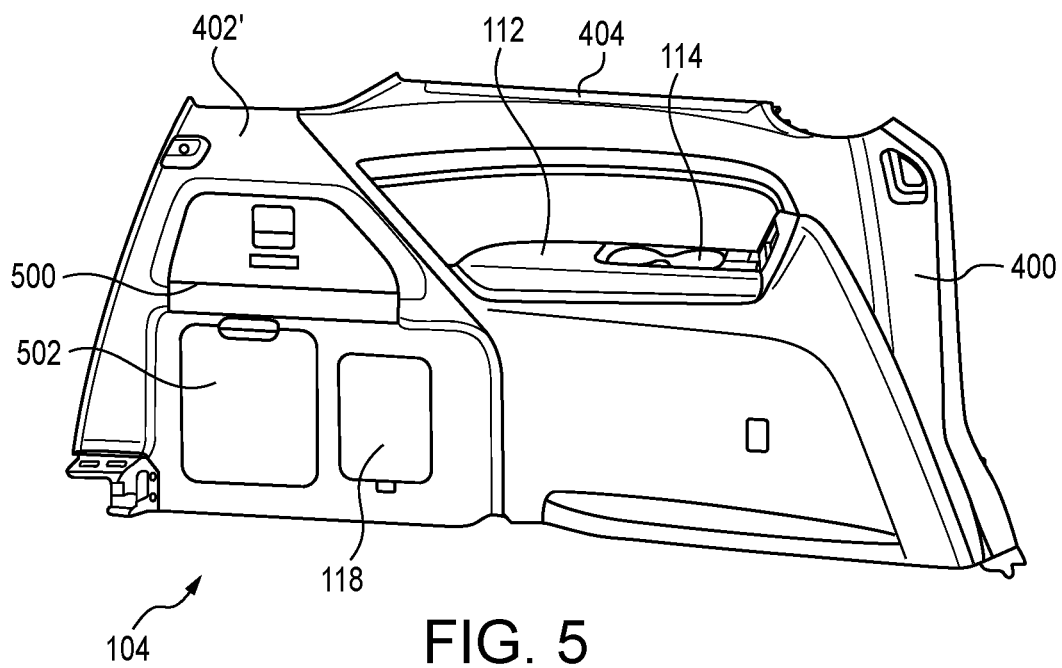
FIG. 5 is a side view of a second embodiment of a rear side lining.
Figure 6:
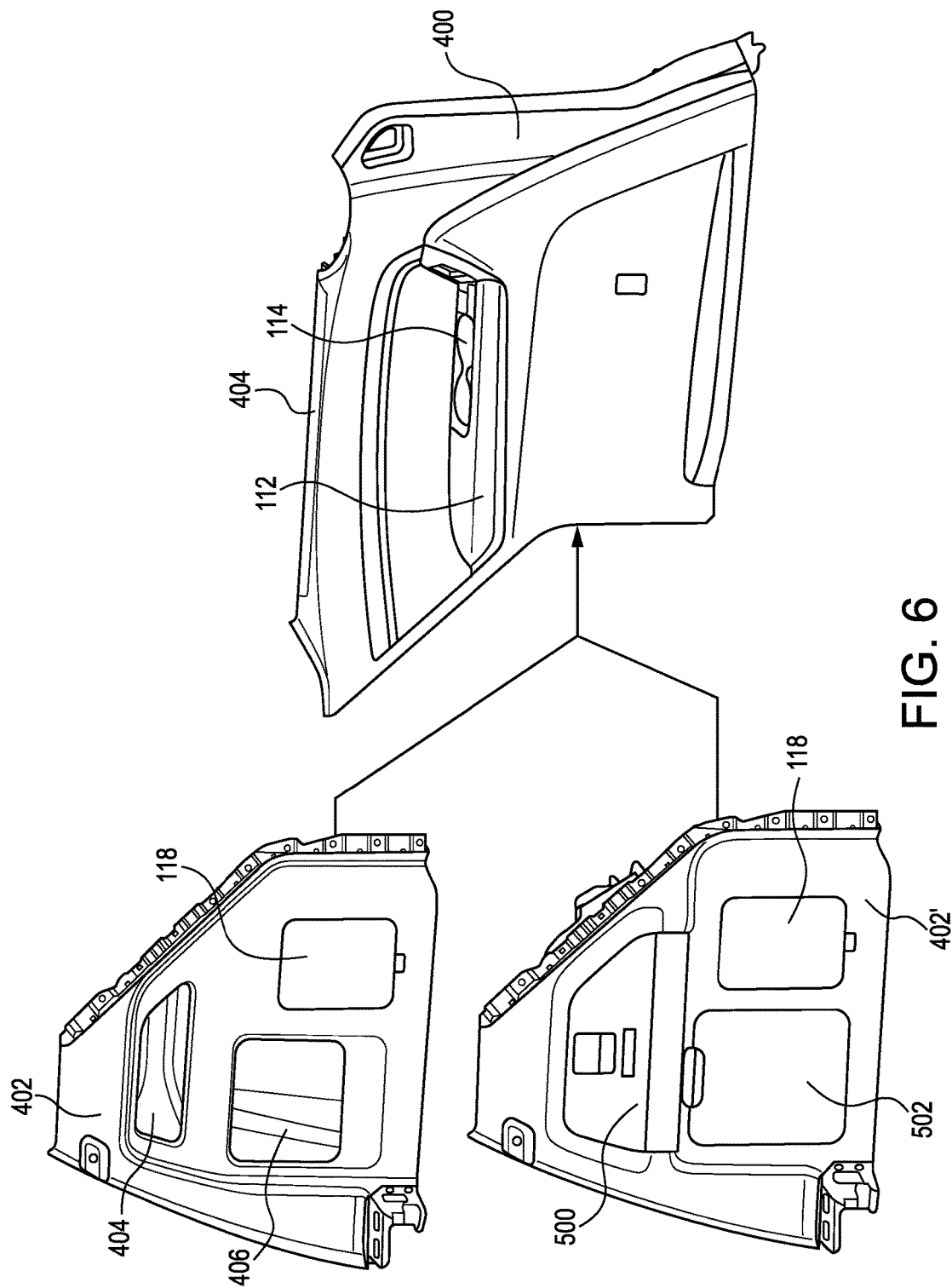
FIG. 6 is an exploded side view of a comparison of the embodiments of FIGS. 4 and 5.

In the embodiments illustrated in FIGS. 4-6, the rear side lining 104 is separated into two modular parts, a front half 400 and a rear half 402. The front half 400 contains the armrest 112, cup holder 114, and sunshade parts 404 that are common to every package version of the rear side lining 104. The rear half 402 is interchangeable between multiple versions, as illustrated in FIG. 6. In the embodiment illustrated in FIG. 4, the rear half 402 is a storage pocket version that includes open storage pockets 404, 406 in the rear half 402 of the rear side lining 104. In the embodiment illustrated in FIG. 5, the rear half 402' is a vacuum version, which includes a vacuum storage area covered by doors 500, 502.

The embodiments described herein are interchangeable outside of the factory, and dealership associates may easily swap the storage pocket version of the rear half 402 and the vacuum version of the rear half 402' at the request of a customer.

Figure 7:
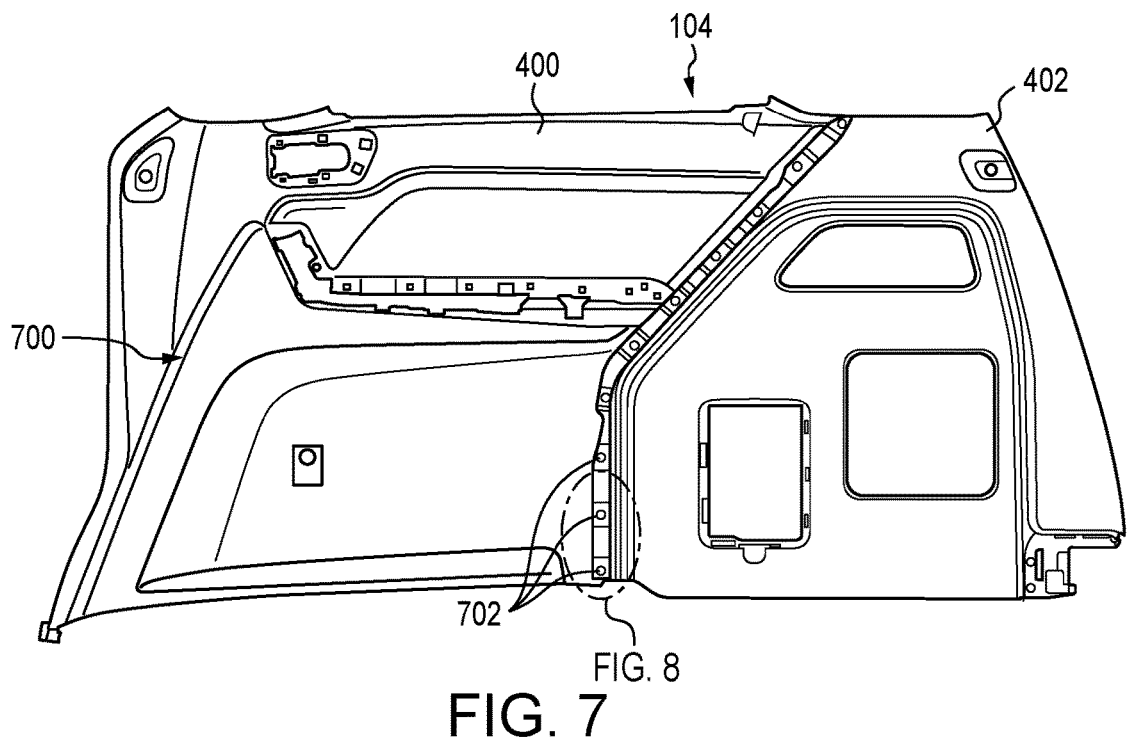
FIG. 7 is a backside view of one embodiment of a rear side lining.
Figure 8:
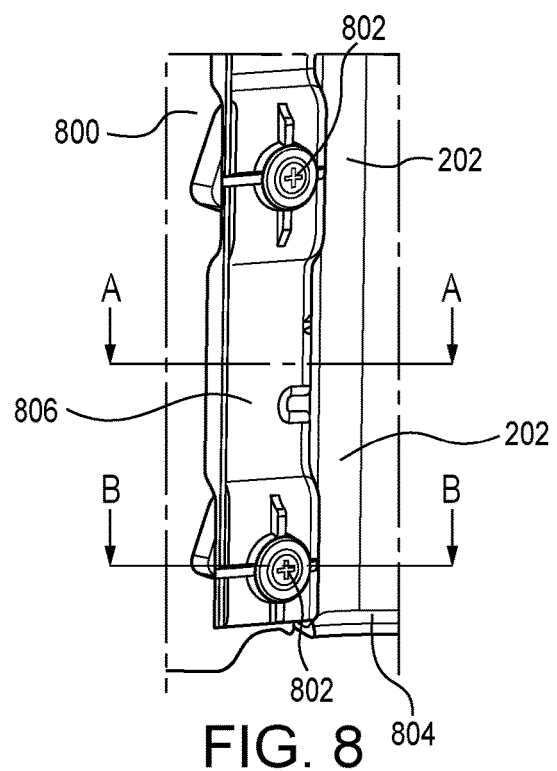
FIG. 8 is a close up view of a portion of FIG. 7.
Figure 9:
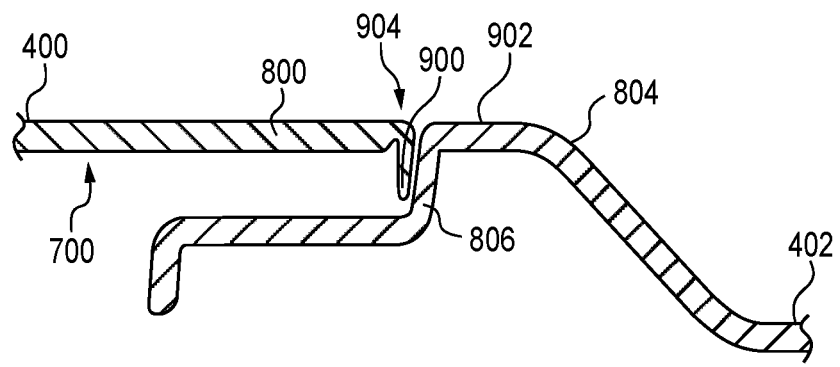
FIG. 9 is a cross-sectional view along line A-A of FIG. 8.
Figure 10:
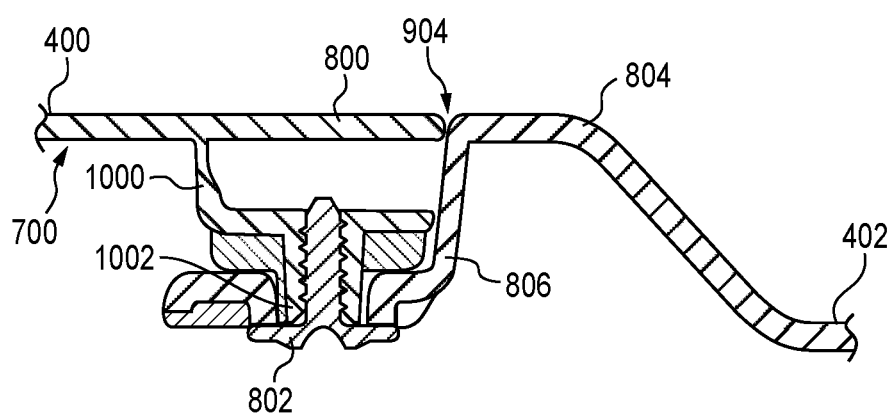
FIG. 10 is a cross-sectional view along line B-B of FIG. 8.
Figure 11:
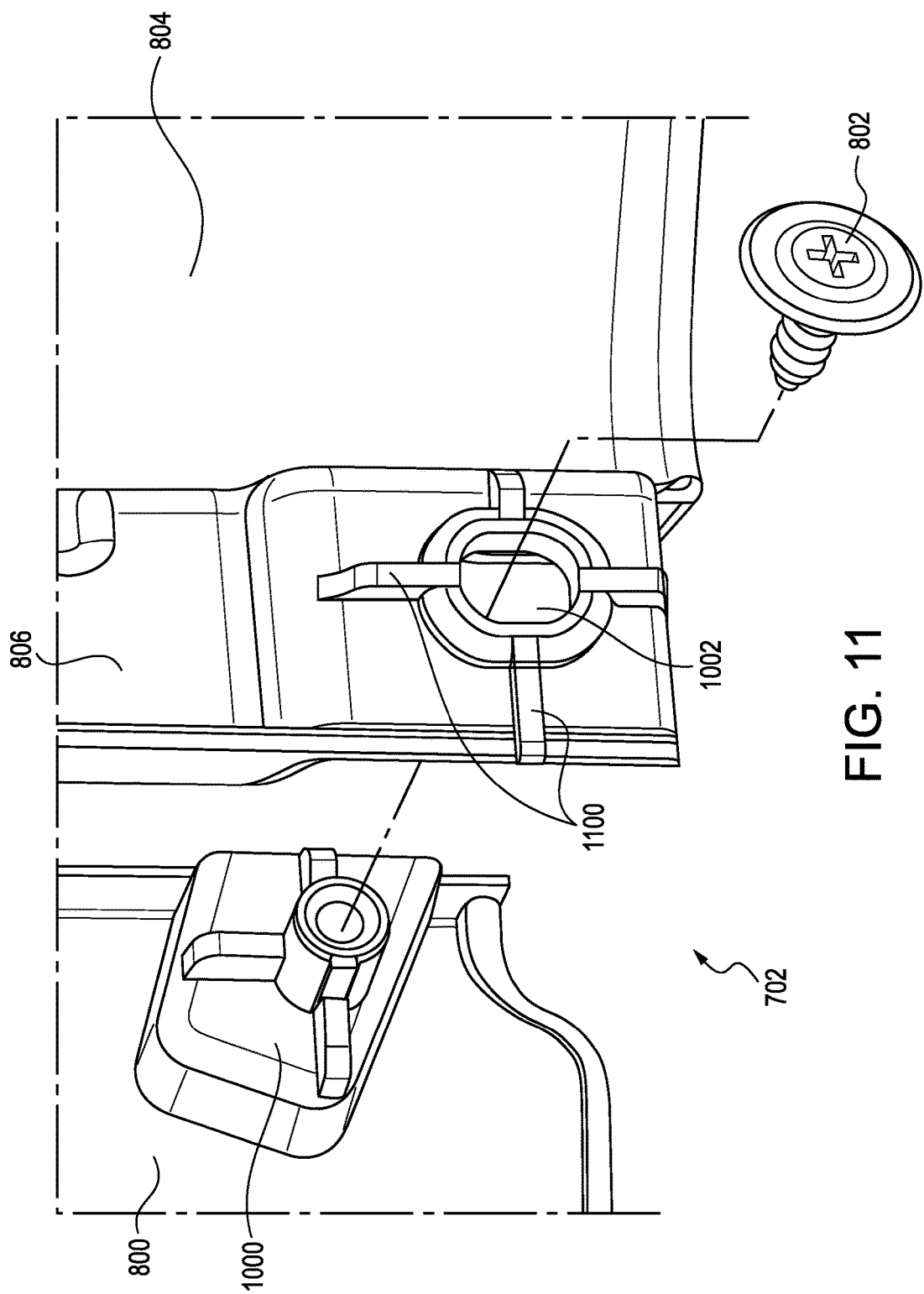
FIG. 11 is an exploded view of a connection point.

FIGS. 7-11 illustrate the construction of the rear side lining 104. FIG. 7 illustrates an embodiment of the back side 700 of the rear side lining 104. FIG. 8 is a close up of a representative portion the connection between the front half 400 and rear half 402 of the rear side lining 104. The front half 400 of the rear side lining 104 is common between all versions rear side lining 402, 402'. FIG. 9 is a cross-section along line A-A of FIG. 8, and FIG. 10 is a cross-section along line B-B of FIG. 8. The front half 400 includes a rearward edge 800 that may include a lip 900. At connection points 702, receivers 1000 for tapping screws 802 extend from the backside 700 of the rearward edge 800 as illustrated in FIG. 10 and FIG. 11, which is an exploded view of a connection point 702. In the embodiment illustrated in the figures, the rearward edge 800 includes 10 receivers 1000.

The forward edge 804 of the rear half 402 has a complimentary shape to that of the rearward edge 800 of the front half 400. The forward edge 804 includes a first portion 902 that rests against the lip 900 of the rearward edge 800 to create a minimal, and preferably unnoticeable, split line 904. An extension 806 extends to the back and away from the forward edge 804 of the rear half 402. Reinforced holes 1002 are located along the extension 806 that coincide with the receivers 1000. In the embodiment illustrated in FIG. 7, 10 reinforced holes 1002 are located in the extension 806. Tapping screws 802 are inserted through the reinforced holes 1002 and into the receivers 1000, thereby joining the front half 400 and rear half 402 of the rear side lining 104. In the illustrated embodiment, the front half 400 and rear half 402 are joined by ten 4×10 mm plastic tapping screws 802. The reinforced holes 1002 are reinforced by ribs 1100 in the extension 806 to prevent degradation of the connection point 702.

Figure 12:
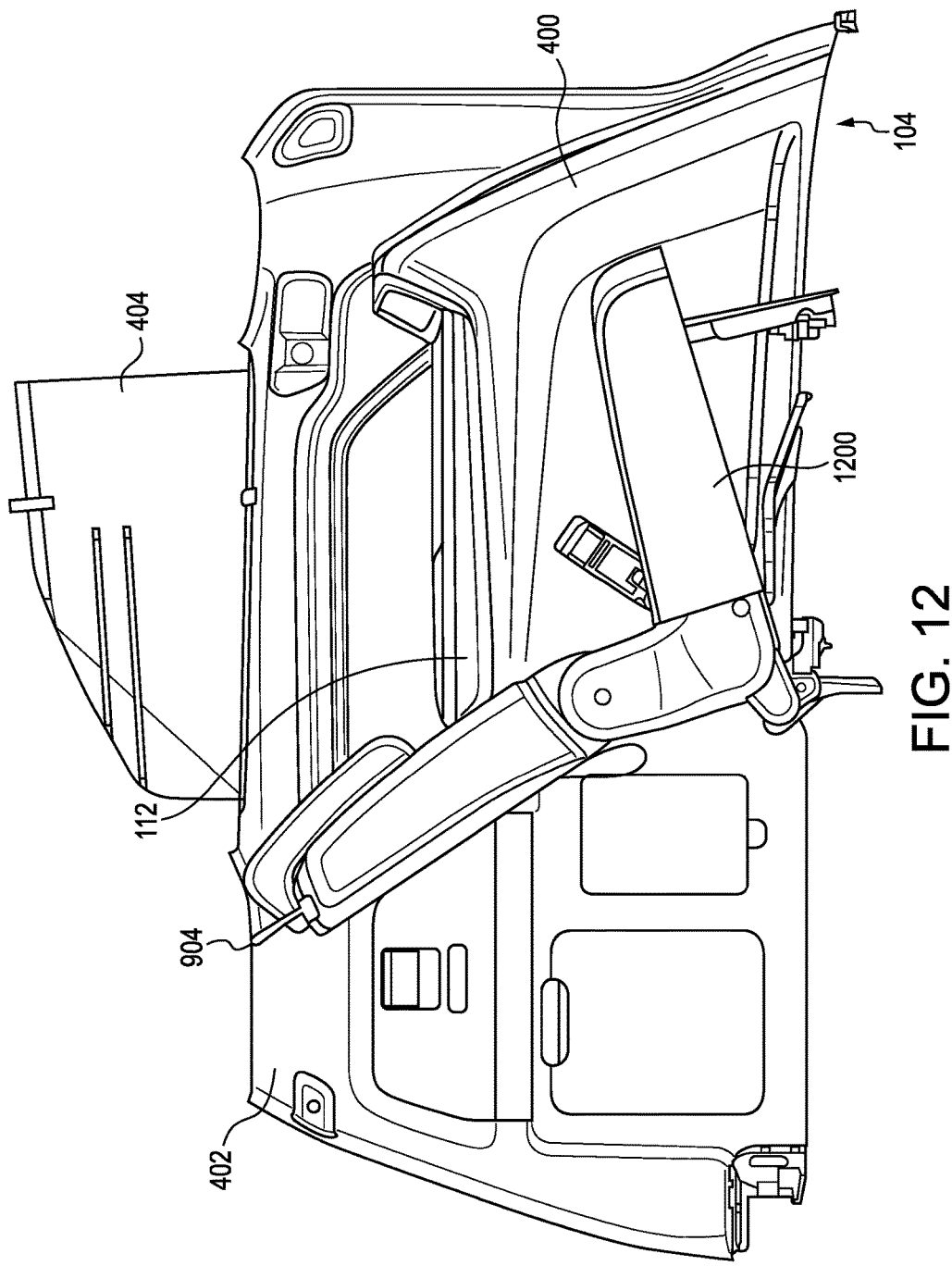
FIG. 12 is a side view of a rear compartment of a motor vehicle.
Figure 13:
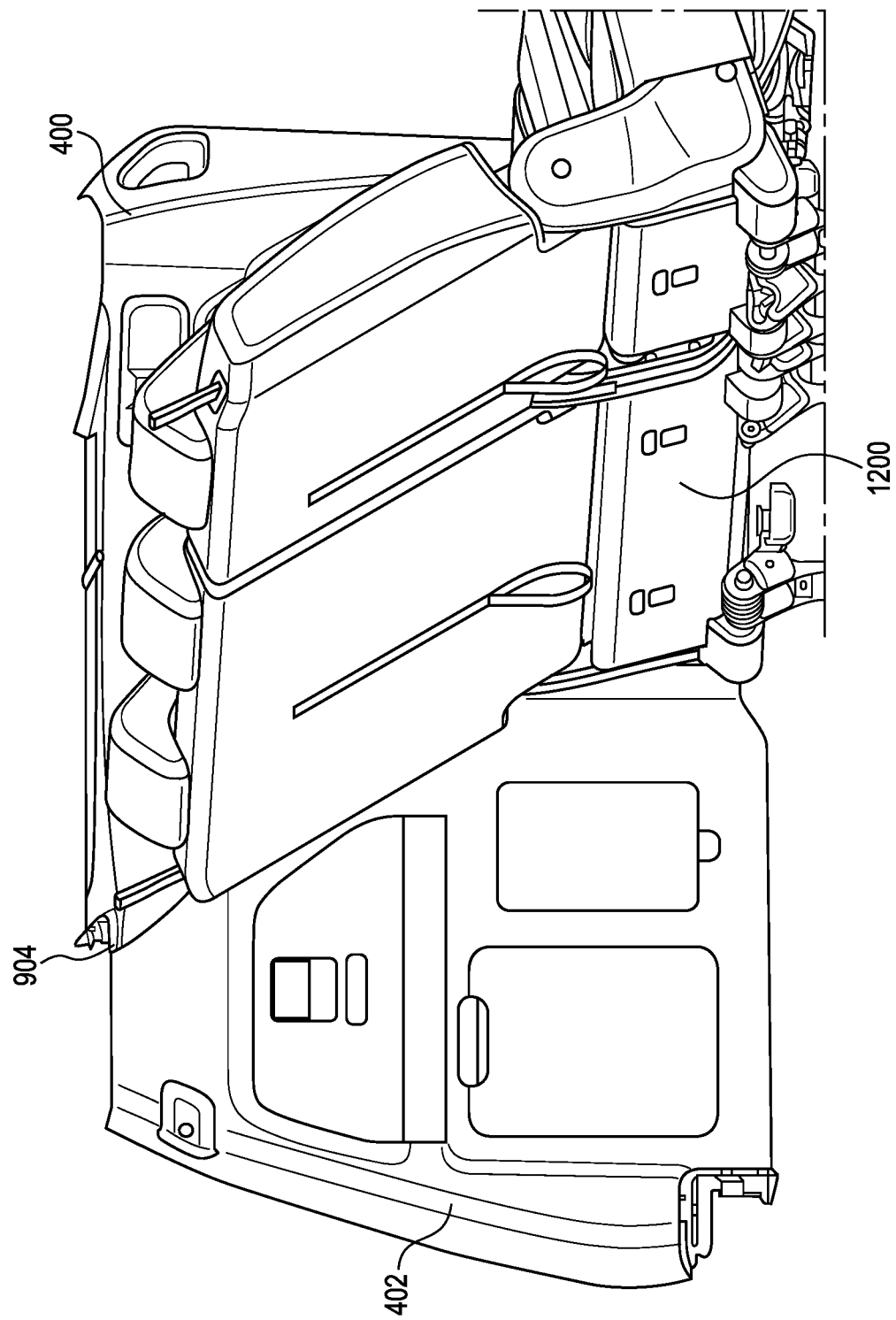
FIG. 13 is a rear perspective view of a rear compartment of a motor vehicle.

As illustrated in FIGS. 12-13, the complimentary shape of the split line 904 is selected to ensure the armrest 112 is able to fit completely in the front half 400 of the rear side lining 104. The complimentary shape of the split line 904 is also designed to complement the profile shape of the rearmost seat 1200 of the motor vehicle 100. Therefore, the seat 1200 acts to further hide the split line 904 between the front half 400 and rear half 402 of the rear side lining 104.

Figure 14:
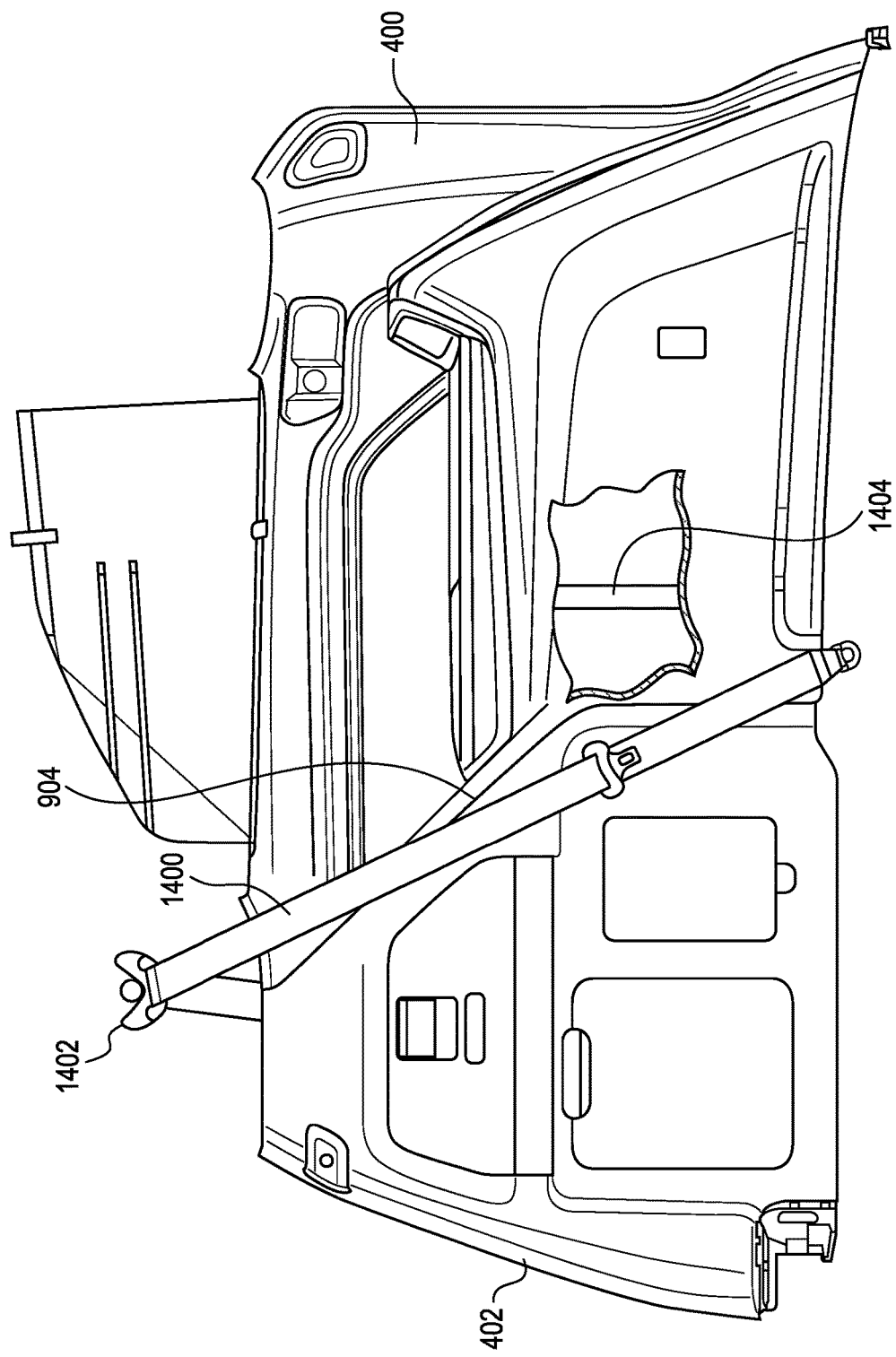
FIG. 14 is a side view of a wall of a rear compartment of a motor vehicle.
Figure 15:
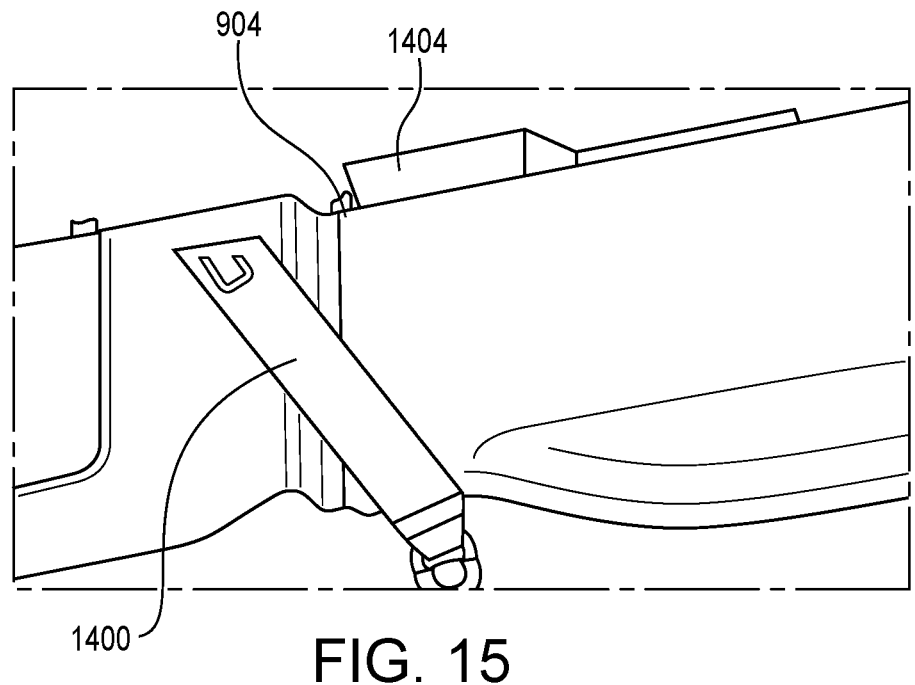
FIG. 15 is a close up view of a portion of FIG. 14.
Figure 16:
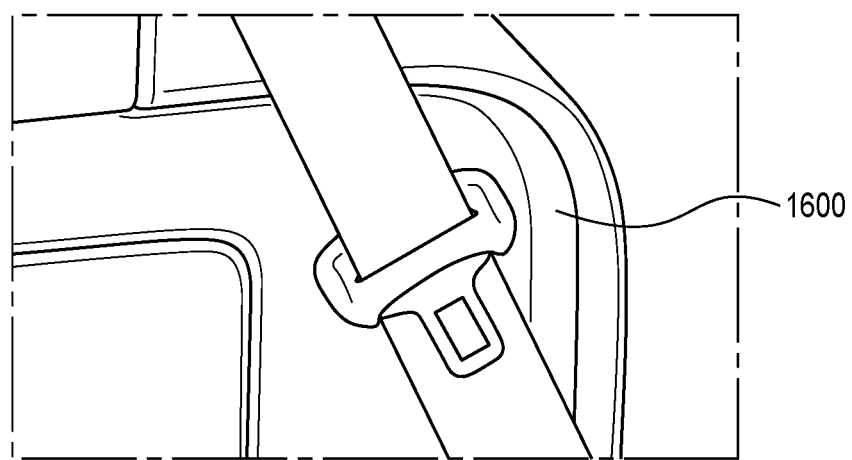
FIG. 16 is a close up view of another portion of FIG. 14.

As further illustrated in FIGS. 14-16, the split line 904 between the front half 400 and rear half 402 of the rear side lining 104 is forward of both the seat belt 1400 mounting location 1402 and the resting location of seat belt tongue 1404, with the resting location of the seat belt tongue 1404 behind a forward bulge 1600 of the rear half 402 of the rear side lining 104. The designed clearance, illustrated in FIG. 16, allows easier access to the seat belt tongue 1404 by a seat user. Additional, the clearance prevents rattle of the seat belt tongue 1404 against the rear side lining 104.

As further illustrated in FIG. 14, which shows a portion of the forward half 400 cut away, a the split line 904 is rearward of a hip bolster 1404 that is covered by front half 400 of the rear side lining 104. Therefore, neither the split line 904 nor the connection points 702 interfere with operation of the hip bolter 1404 in a crash event.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A modular side lining forming a portion of an interior surface of a motor vehicle, comprising:
    a fastener;
    a first lining member, the first lining member comprising:
        a first surface along an edge of the first lining member; and
        at least one receiver for receiving the fastener;
    a second lining member, the second lining member comprising:
        a second surface along an edge of the second lining member, the second surface abutting the first surface to form a split line;
        an extension extending from the second surface having at least one hole for receiving the fastener;
        a storage compartment for a mobile vacuum cleaner; and
        a lid for closing the storage compartment.

2. The modular side lining of claim 1 wherein the first lining member further comprises:
    an armrest.

3. The modular side lining of claim 2 wherein the first lining member further comprises:
    a cup holder.

4. The modular side lining of claim 1 wherein the first lining member is longitudinally forward of the second lining member.

5. A motor vehicle, comprising:
    a body;
    a rear compartment area have a floor and two walls;
    a rear seat fixed to the floor of the rear compartment area; and
    a modular side lining forming a portion of an interior surface of the compartment area and covering the at least one of the two walls of the compartment area, comprising:
    a fastener;
    a first lining member, the first lining member comprising:
        a first surface along an edge of the first lining member; and
        at least one receiver for receiving the fastener;
    a second lining member, the second lining member comprising:
        a second surface along an edge of the second lining member, the second surface abutting the first surface to form a split line; and
        an extension extending from the second surface having at least one hole for receiving the fastener.

6. The motor vehicle of claim 5 wherein the second lining member further comprises:
    a storage compartment.

7. The motor vehicle of claim 5 wherein the second lining member further comprises:
    a storage compartment for a mobile vacuum cleaner; and
    a lid for closing the storage compartment.

8. The motor vehicle of claim 5 wherein the split line is laterally outward of the seat such that the seat obscures the split line from sight.

9. The motor vehicle of claim 5 further comprising:
a seat belt having a mounting location on at least one of the two walls of the rear compartment, the seat belt further comprising:
a tongue for connecting the seat belt to a buckle;
wherein the split line is longitudinally forward of the mounting location of the seat belt.

10. The motor vehicle of claim 9 wherein the tongue of the seat belt has a resting location, the split line being longitudinally forward of the resting location of the tongue of the seat belt.

11. The motor vehicle of claim 5 further comprising:
a hip bolster mounted to at least one of the walls of the rear compartment;
wherein the hip bolster covered by the modular side lining; and
wherein the hip bolster is longitudinally forward of the split line.

* * * * *